INVENTOR
PAUL R. JONES
BY Moody and Harris
ATTORNEYS

INVENTOR.
PAUL R. JONES
BY Moody and Harris
ATTORNEYS

MAGNETIC TAPE RECORDING AND REPRODUCTION SYSTEM

Filed Dec. 19, 1963 4 Sheets-Sheet 3

INVENTOR.
PAUL R. JONES
BY
Moody and Harris
ATTORNEYS

Sept. 12, 1967 P. R. JONES 3,341,833

MAGNETIC TAPE RECORDING AND REPRODUCTION SYSTEM

Filed Dec. 19, 1963 4 Sheets-Sheet 4

INVENTOR.
PAUL R. JONES
BY
Moody and Harris
ATTORNEYS

United States Patent Office 3,341,833

Patented Sept. 12, 1967

3,341,833

MAGNETIC TAPE RECORDING AND REPRODUCTION SYSTEM

Paul R. Jones, Cedar Rapids, Iowa, assignor to Collins Radio Company, Cedar Rapids, Iowa, a corporation of Iowa Filed Dec. 19, 1963, Ser. No. 331,836
11 Claims. (Cl. 340—174.1)

ABSTRACT OF THE DISCLOSURE

A system for use with a magnetic recording means which has two magnetic transducers capable of reading information on a tape and with storage means such that information recorded at various times can be chosen for reproduction. The invention is particularly useful in aircraft to collect ground data which may either be read currently or which may be collected and reproduced at a later date.

This invention relates to a tape control system and more particularly to a system for recording data on magnetic tape and presenting the same either while said data is substantially current or at a selectable later time.

Systems are well known in the electronics art for collecting and immediately presenting collected data, such as, for example, by means of conventional radar or radiometric systems. Likewise, systems are well known for recording collected data for later readout purposes, such as, for example, by storing the data on magnetic tape, and then later reading the stored data, by means of a conventional tape machine, for example.

No known practical system exists, however, that is capable of simultaneously reading different portions of tape having data recorded thereon and immediately presenting either of the two. Moreover, no system, heretofore proposed or utilized, has been capable of recording collected data, simultaneously reading current data and stored data recorded a selected time earlier, and then immediately presenting either the current data or the stored data, as desired.

It is therefore an object of this invention to provide a tape system having means capable of simultaneously reading different portions of tape having data recorded thereon and immediately presenting either of the two portions.

It is yet another object of this invention to provide a tape system for recording, storing and presenting data which includes a pair of reading heads one of which reads recorded data while substantially current and the other of which reads stored data, and presentation means for presenting the data read by either of said reading heads to the exclusion of the other.

The system of this invention is particularly well suited for use in a vehicle, and particularly to use in an aircraft, to collect ground level data (i.e., location of features such as lakes, roads, houses, vehicles, etc.) where it is desired that the data not only be recorded and read currently, but where it is also desirable to be able to readily recall previously collected data without losing current data collecting and reading capabilities. When the system of this invention is used in an aircraft, means is provided for transporting the tape through the recorder and current data reader at a speed proportional to the velocity of the aircraft so that a presentation of current data will at all times reflect the current position of the aircraft.

It is therefore another object of this invention to provide a tape system for recording, storing and presenting data which, when mounted in an aircraft, records ground level data, which data is readable while substantially current and at a selectable later time so that currently read data may be readily recalled if desired.

It is yet another object of this invention to provide a tape system for recording, storing and presenting data which, when mounted in an aircraft, includes means for causing the tape input rate to a recorder and tape reader to be at a speed proportional to the ground speed of the aircraft.

With these and other objects in view which will become apparent to one skilled in the art as the description proceeds, this invention resides in the novel construction, combination and arrangement of parts substantially as hereafter described and more particularly defined by the appended claims, it being understood that such changes in the precise embodiments of the herein disclosed invention may be included as come within the scope of the claims.

The accompanying drawings illustrate two complete examples of the embodiments of the invention according to the best mode so far devised for the practical application of the principles thereof, and in which.

Figures 1, 2:
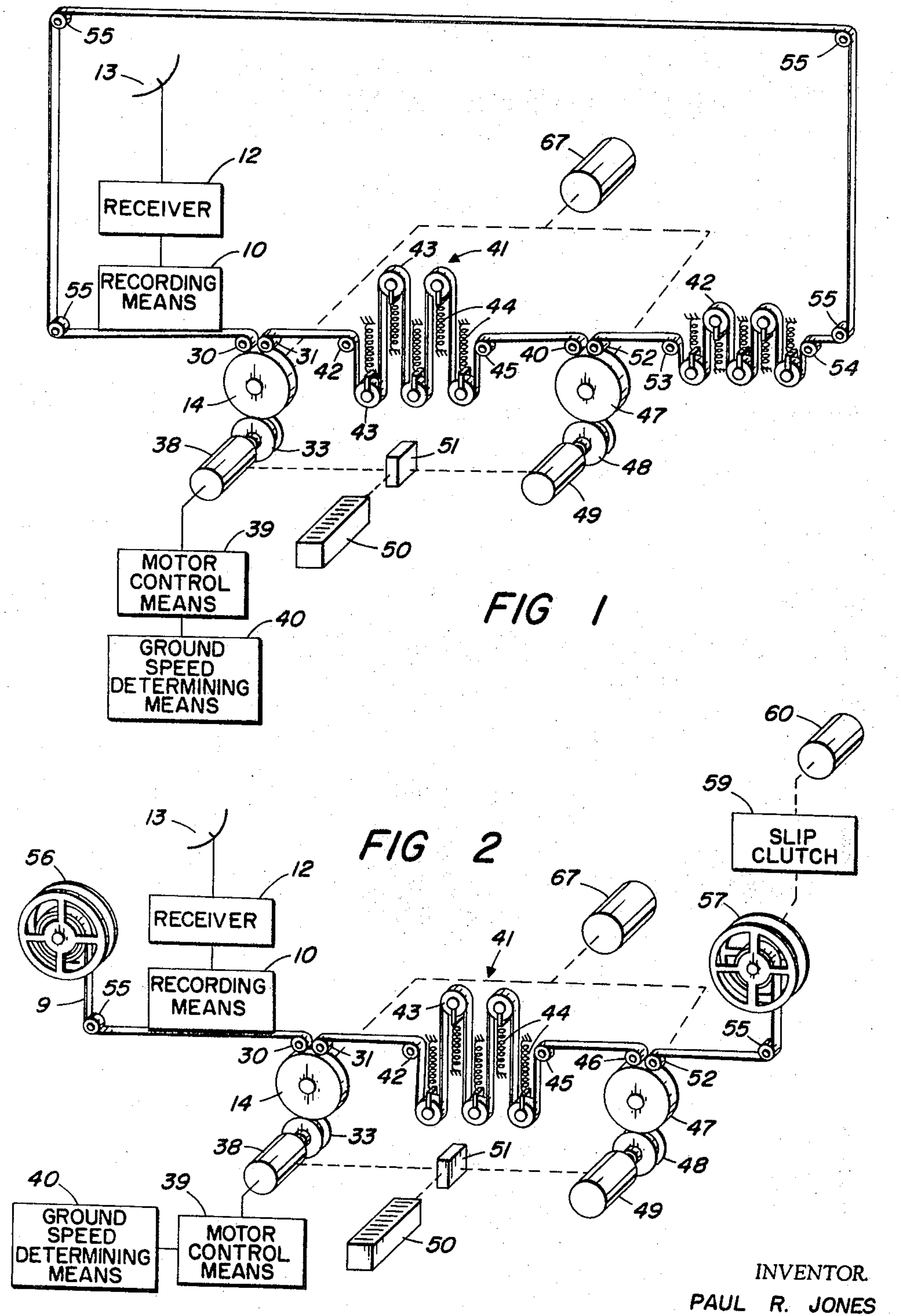
FIGURE 1 illustrates diagrammatically the system of this invention utilizing endless magnetic tape.
FIGURE 2 illustrates diagrammatically an alternate embodiment of the system of this invention.

Referring now to the drawings in which like numerals have been used for like characters throughout, the numeral 7 indicates generally the system of this invention utilizing endless tape (FIGURE 1), while the numeral 8 indicates generally the alternate embodiment of the system (FIGURE 2).

As shown in FIGURE 1, magnetic tape 9 is fed to a conventional data recording means 10. Magnetic tape 9 is likewise conventional, except that the tape has a series of perforations 11 (see FIGURE 5) along each edge. Recording means 10 receives the information, or data, to be recorded from a conventional receiving means 12 such as, for example, a radar system or a radiometer, both of which receive information through a conventional directional antenna 13.

After the incoming data is recorded on the magnetic tape 9, the tape is then fed through a current data tape reader unit 14. This reader unit, as shown in detail in FIGURE 5, includes a rotatable reading head 15 capable of reading the data on the portion of the magnetic tape adjacent to the head. This information is then coupled from the reading head through coaxial cable 16. Since the recorder 10 preferably records each span of the antenna on a separate line on the tape, rotation of the head causes a number of scan lines to be repeatedly presented, such as 150 scan lines, for example, to fill a conventional presentation cathode ray tube, such as used in comercial television, for example.

Figure 5:
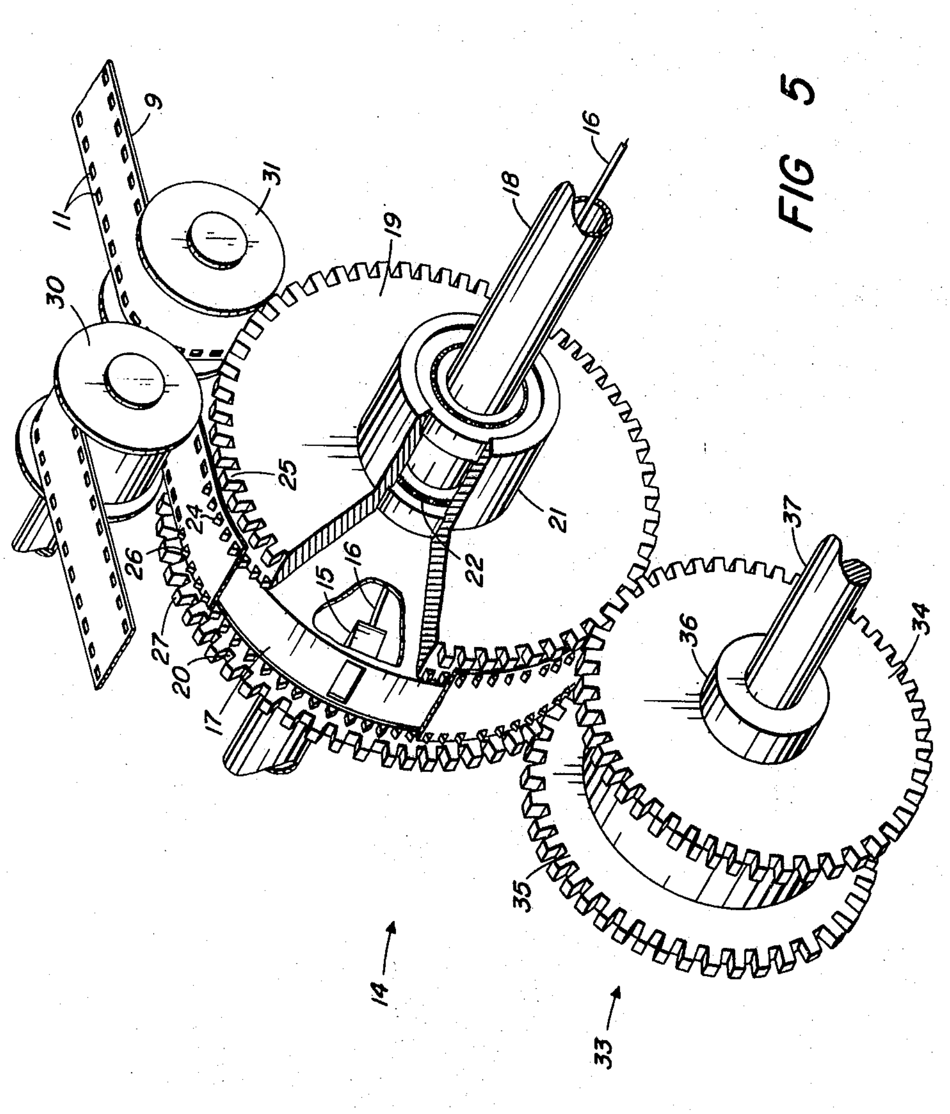
FIGURE 5 is a partially cut away perspective view illustrating the rotating reading head and tape positioning and drive means of this invention as shown diagrammatically in FIGURES 1 and 2.

As shown in FIGURE 5, the rotatable reading head 15 is mounted at the periphery of a cylinder 17, which cylinder is attached to a shaft 18 and constrained to rotation therewith. Mounted at each side and adjacent to cylinder 17 is a pair of discs 19 and 20 which hold the tape in position. Each disc is mounted for rotation on shaft 18 by means of a hub 21 having a bearing 22 therein so that each disc rotates freely about shaft 18. Discs 19 and 20 terminate at the periphery in an inner and outer set of teeth (24 and 25, respectively, of disc 19 and 26 and 27, respectively, of disc 20) which extend raidally outwardly beyond the periphery of cylinder 17. The inner teeth 24 and 26 of discs 19 and 20, respectively, are spaced so that teeth 24 are received in the perforations 11 at one edge of the tape 9, while the teeth 26 are received in the perforations 11 at the opposite edge of the tape.

As shown in FIGURES 1, 2, and 5, a pair of sprockets 30 and 31 are mounted adjacent to reader unit 14 with tape 9 being fed over sprocket 30 to supply tape to the unit and over sprocket 31 when taken from the unit. Sprockets 30 and 31 assure that the tape will be wound about a major portion of discs 19 and 20 and thus be adjacent to a major portion of the path traversed by the reading head 15 as it rotates (if the head is moved along a different path, in a straight line path, for example, positioning of the tape is, of course, altered so that the tape is adjacent to a major portion of the selected path regardless of configuration).

The tape is moved about the cylinder 17 by a gear wheel 33, which gear wheel includes a pair of gears 34 and 35 axially spaced the same distance as are discs 19 and 20 so that the teeth of gear 34 mesh with the teeth 25 of disc 19 and the teeth of gear 35 mesh with the teeth 27 of disc 20. Gear wheel 33 has a hub 36 in which a shaft 37 is received with the hub attached to the shaft in conventional manner so as to be constrained to rotation therewith.

As shown in FIGURES 1 and 2, shaft 37 is connected to a motor 38 to control the tape input rate to the recorder 10 and the current data reader unit 14. For utilization in an aircraft, the motor 38 is controlled by a conventional motor control means 39, which, in turn, is controlled by a conventional ground speed determining means 40 so that the tape input rate is, at all times, proportional to the velocity of the aircraft. This assures that the data read by the current reader unit 14 always represents true ground level information.

After the tape passes over sprocket 31 and is thus withdrawn from the current data reader unit 14, it is fed to a conventional data accumulator, or storage means 41 over sprocket 42. As shown in FIGURES 1 and 2, storage means 41 may include a plurality of sprockets 43 every other one of which is spring biased by springs 44 in one direction, while the remaining sprockets are spring biased in the opposite direction. Thus, as the tape is fed into the storage unit, adjacent sprockets 43 move farther apart and tape is thus accumulated in the storage unit. As much tape can be stored, of course, as required simply by providing as many sprockets 43 and springs 44 as deemed necessary.

As the tape is withdrawn from the accumulator, or storage unit 41, it is fed over a sprocket 45 and a sprocket 46 to a second, or recall, data tape reader unit 47 driven by recall tape reader drive 48. This tape reader unit is identical to current data tape reader unit 14 and, of course, will read the data stored on the magnetic tape at a later time than does the current data reader since the tape must first be passed through the storage unit 41. It is the purpose of the recall data tape reader to enable an operator to recall data that has previously been read at the current data tape reader without the necessity of losing time or information, as is normally necessary if the tape must be rerouted or backed up for recall purposes to a single reader unit.

The recall tape reader drive 48 is connected to motor 49, which, in turn, is energizsed through control means 39 (see FIGURES 3 and 4) when the tape accumulator is full to assure that the tape withdrawal rate from the tape accumulator will be the same as the input rate to avoid system failure. In addition, motor 49 may also be energized to operate at a fast speed so that tape can be withdrawn from the storage unit 41 faster than the tape input rate thus providing selectable recall of data.

The amount of tape in storage unit 41 is indicated by a counter 50. Counter 50 is connected to both motors 38 and 49 through a differential 51, and responsive thereto, indicates, at all times, the tape actually stored in the storage unit.

As shown in FIGURE 1, tape taken from the recall data tape reader unit 47 is fed over sprockets 52 and 53 to a second tape accumulator, or storage unit 54, which accumulator may be identical to that of the first storage unit 41. The purpose of this tape accumulator is to take up all tape slack when using an endless tape. As shown in FIGURE 1, tape is withdrawn from the second tape accumulator 54, as needed, and fed to the recorder 10 afetr a series of sprockets designated generally by the numeral 55.

Figure 4:
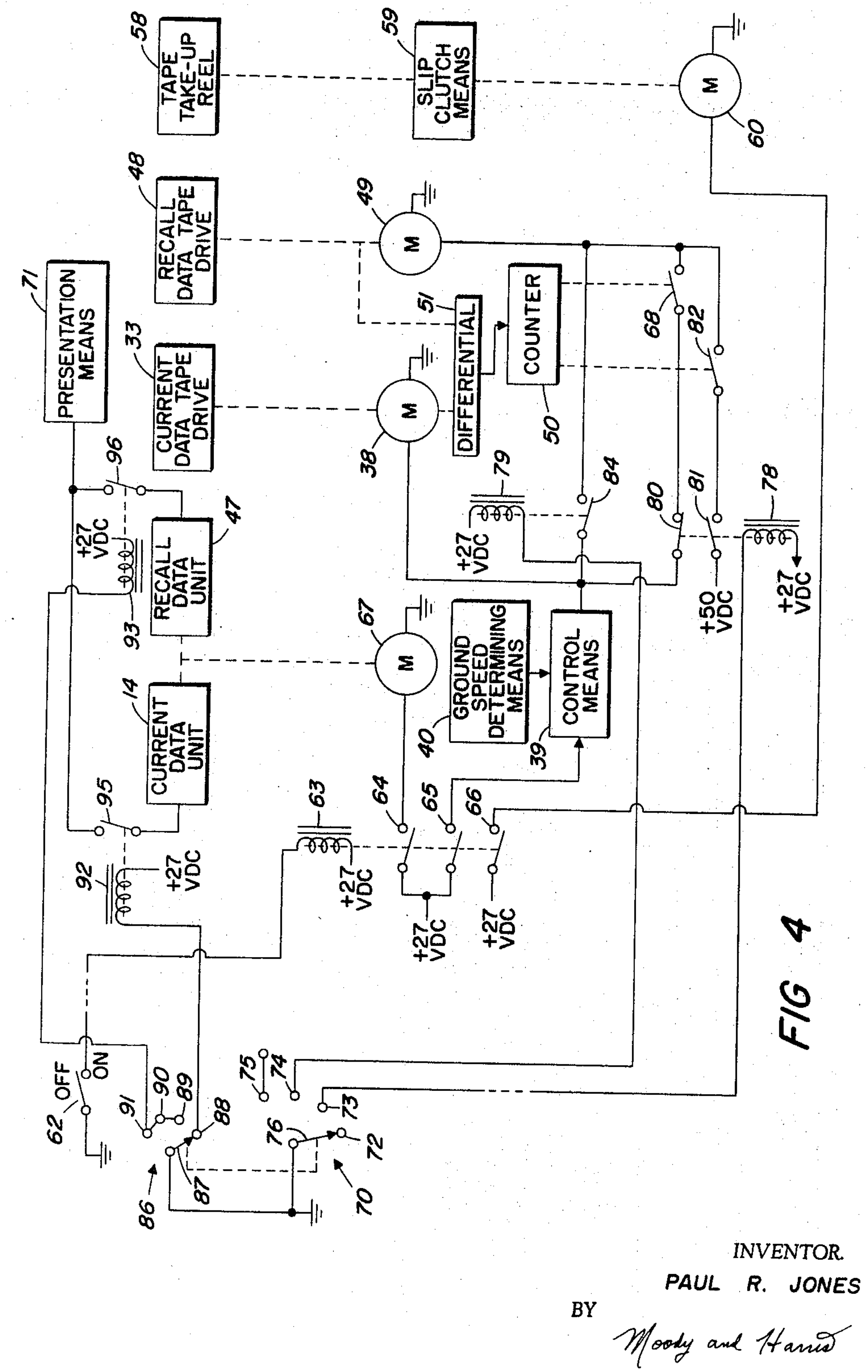
FIGURE 4 is a partial schematic diagram of the electrical system of this invention as illustrated in FIGURE 2.

As shown in FIGURE 2, when the recorded data is to be retained, a supply reel 56 is provided and tape is fed to recorder 10 from supply reel 56 (utilizing as many sprockets 55 as are deemed necessary to properly route the tape to the recorder). The remainder of system 8 (shown in FIGURE 2) may be identical to that of system 7 (shown in FIGURE 1) except that the second tape accumulator 54 is eliminated and a take-up reel 57 is provided to collect the tape after it passes through the recall data tape reader unit 47. As shown in FIGURES 2 and 4, reel 57 is constantly urged to rotation in one direction (counter-clockwise as shown in FIGURE 2) to assure immediate winding of the tape on the reel after it passes through the recall data reader. Reel 57 is fastened to shaft 58, which shaft is connected through a slip-clutch 59 to a motor 60.

Figure 3:
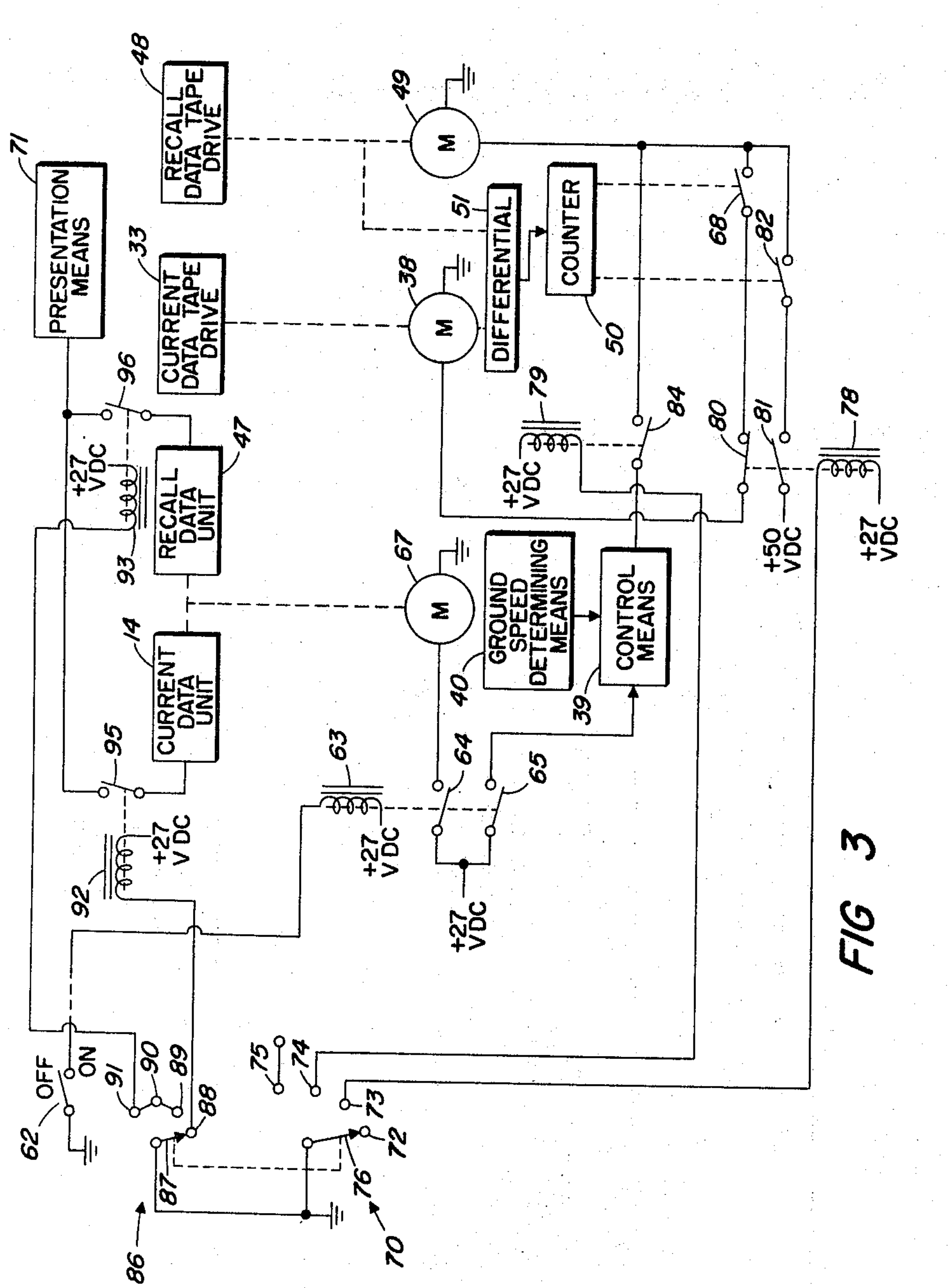
FIGURE 3 is a partial schematic diagram of the electrical circuit of the system of this invention as shown in FIGURE 1.

As shown in FIGURE 3, the electrical network for the tape system, as shown in FIGURES 1 and 2, includes a power switch 62, which switch may be remotely situated as, for example, on an aircraft control panel. When power is supplied to the system by closing switch 62, a ground is supplied to relay 63 to energize the winding, closing relay actuated switches 64 and 65. In addition, if system 8 is utilized (FIGURE 2 embodiment), a third relay actuated switch 66 is also closed.

When switch 64 is closed, a tape reader drive motor 67 is energized to drive the cylinders in each data reading unit to thus rotate both reading heads at a constant speed, while closing switch 65 energizes motor 38 (through control means 39) to drive current data tape drive unit 33, and energizes motor 49 (through control means 39 when limit switch 68 is closed) to drive the recall data tape drive unit 48. Closing of switch 66 (FIGURE 4) energizes motor 60 to constantly urge rotation of take-up reel 57 through slip-clutch 59.

Although motor 38 is energized when the master switch is closed, the tape input rate to recorder 10 and current tape reader unit 14 is maintained at a speed proportional to the velocity of the aircraft since motor 38 is energized through control means 39, which, as brought out hereinabove, is controlled by the ground speed determining means 40 commonly found in an aircraft.

A multiposition switch 70 is also provided on the control panel so that an operator can control the system and switch to the presentation desired, which presentation appears at presentation means 71, which could, for example, include a conventional cathode ray tube. Multiposition switch 70 has four stationary contacts 72, 73, 74 and 75 and a rotatable contact 76 (connected to ground). Contacts 72 (current data contact) and 75 (recall data-stopped motor position contact) are open contacts, while contact 73 (recall data-fast motor speed contact) is connected to one side of relay winding 78 (the other side of which is connected to a +27-v. D.C. power supply), and contact 74 (recall data-ground speed contact) is connected to one side of relay winding 79 (the other side of which is also connected to the +27-v. D.C. power supply).

Energization of relay winding 78 opens relay actuated switch 80 and closes relay actuated switch 81. Opening of switch 80 disconnects motor 49 from control means 39, while closing of switch 81 connects motor 49 to a higher voltage source (+50 volts D.C. as shown in FIGURES 3 and 5) so that the motor operates at higher speed and hence withdraws tape from storage unit 41 at a faster rate. If the switch 70 should be left in the recall data-fast motor speed position until the storage unit 41 is empty, minimum limit switch 82, connected to counter 50, will open to break the high voltage supply to motor 49 and thus stop the motor.

Energization of relay winding 79 closes relay actuated switch 84 to connect control means 39 to motor 49 so that, when the switch 70 is in the recall data-ground speed position, the tape is fed from storage unit 41 to the recall data tape reader unit 47 at a speed proportional to the ground speed of the aircraft.

A second multiposition switch 86 has a grounded rotatable contact 87 constrained to rotation with rotatable contact 76 of multiposition switch 70, and four stationary contacts 88, 89, 90, and 91. Contact 88 is connected to one side of relay winding 92 (the other side of which is connected to the +27-v. D.C. power supply), while contacts 89, 90, and 91 are connected, in common, to one side of relay winding 93 (the other side of which is also connected to the +27-volt power supply).

Energization of relay winding 92 closes relay actuated switch 95 to connect the current data reading unit 14 to the presentation means 71, while energization of relay winding 93 closes relay actuated switch 96 to connect the recall data reading unit to presentation means 71.

In operation, and with the master switch closed so that the data reading unit motor 67 is energized to rotate the reading heads and motor 60 energized to bias take-up reel 57 to rotation (im embodiment of FIGURES 2 and 4 is used), when tape is first fed to recorder 10 and current data reader unit 14, switches 70 and 86 are normally in the current data position (rotatable contact 76 of switch 70 engaging contact 72 and rotatable contact 87 of switch 86 engaging contact 88). This connects the current data reading unit 14 to the presentation means 71. Since tape storage unit 41 is usually not filled initially, motor 38 will be energized to feed tape to the recorder 10 and current data reading unit 14 at a rate proportional to ground speed, but motor 49 is not energized during this period since maximum limit switch 68 is open until the storage unit 41 is filled. When counter 50 indicates that storage unit 41 is filled, limit switch 68 (attached to the counter) is closed and motor 49 is energized so that tape is withdrawn from the storage unit at the same rate as it is deposited. If endless tape is used, as shown in FIGURES 1 and 3, tape storage unit 54 will receive all of the tape after it is fed to the recall data reader unit 47 and retain the tape until withdrawn for use again in recording. If a reel of tape is to be used, then take-up reel 57 receives all of the tape after it is fed to the recall data reading unit.

If the operator should desire to recall data on that portion of the tape first stored and not yet withdrawn from storage unit 41, switches 70 and 86 are rotated to the recall data-ground speed position (rotatable contact 76 of switch 70 engaging contact 74 and rotatable contact 87 of switch 86 engaging contact 90). This closes switch 84 (by energizing relay winding 79) to energize motor 49 and causes tape withdrawal from the storage unit at the input rate (which is proportional to the ground speed of the aircraft).

If the operator wishes to retain a particular portion of recorded data then being presented by the data recall reader, he merely rotates switch 70 to the recall data stop position (rotatable contact 76 in engagement with contact 75). In this position, motor 49 is not energized (unless the tape accumulator is filled to colse limit switch 68) and the data presented at presentation means 71 will remain unchanged.

If it is desired to recall data stored in the accumulator (but not on the portion of the tape first to be withdrawn) switch 70 is rotated to the recall data-fast motor speed position (rotatable contact 76 in engagement with contact 73). This closes switch 81 and energizes motor 49 with a high voltage to cause withdrawal of tape from tape accumulator 41 at a fast speed. When the portion of the tape having the desired information thereon is then fed to the recall data reading unit, the operator may then rotate switch 70 either to the recall data-stop position or the recall data-ground speed position for viewing the presented data.

From the foregoing, it should be obvious to those skilled in the art that this invention provides a heretofore unavailable tape control system that is particularly well-suited for use in an aircraft.

What is claimed as my invention is:

1. A system for storing, reading, and presenting data, said system comprising: recording tape having data recorded thereon; first tape reading means for receiving said tape and reading the data recorded on a portion thereof; tape storage means for receiving said tape from said first tape reading means and storing the same; first control means for governing the tape input rate to said first tape reading means and to said storage means; second tape reading means for receiving said tape from said storage means and reading the data recorded on a portion thereof other than that being read by said first tape reading means; second control means for governing the tape withdrawal rate from said storage means whereby the amount of tape between the portions being read by each said tape reading means is controlled, said withdrawal rate being capable of differing from said input rate, said second control means including means for causing withdrawal of tape from said storage means at least as fast as said tape input rate whenever said storage means is filled; and presentation means for presenting said data being read by at least one of said tape reading means.

2. The system of claim 1 wherein each said tape reading means includes a moving reading head and tape positioning means for maintaining said tape portion adjacent to the path traversed by said movig head so that each said moving head reads the data stored on said tape portion during a large portion of reading head movement.

3. The system of claim 2 wherein said tape input and withdrawal rates are much lower than is the rate of movement of said moving reading head.

4. The system of claim 2 wherein each said moving reading head is mounted for rotation so as to traverse a circular path, and wherein said tape positioning means includes means for flexing said tape portion into a lengthwise arcuate shape having a radius slightly larger than that of the circular path traversed by each of said reading head.

5. The system of claim 4 wherein said reading head is attached near the periphery of a rotatable cylinder, and wherein said tape positioning means includes a pair of discs slightly greater in diameter than said cylinder, said discs being coaxially mounted for rotation at opposite sides of said cylinder and engaging said recording tape at the periphery of each said disc.

6. A system for storing, recording and reading data comprising a recording tape, means for receiving said tape and recording received data thereon, first tape reading means for receiving said tape after said data has been recorded thereon and reading said data while substantially current, tape accumulation means for receiving said tape having said data recorded thereon and storing said tape, second tape reading means for receiving said tape from said tape accumulation means and reading said data recorded thereon at a time later than reading occurs at the first tape reading means, counter means connected to both said first and second tape reading means, and said counter means indicating the amount of storage tape in said tape accumulation means at all times.

7. The system of claim 6 further characterized by means connected to said counter means for causing withdrawal of said storage tape from said tape accumulation means at said tape input rate whenever said tape accumulation means is filled.

8. An aircraft mounted system for recording, storing, and presenting ground level data, said system comprising: magnetic tape; recording means for recording ground level data on said tape; current tape reading means for receiving said tape from said recording means and reading the data recorded thereon while substantially current; first control means including speed control means for causing said tape input rate to said recording means and said first tape reading means to be proportional to the ground speed of said aircraft; tape accumulation means for receiving said tape from said current data reading means and storing the same; recall tape reading means for receiving said tape from said tape accumulation means and reading the ground data stored on said tape; second control means connected with said first control means for controlling the tape withdrawal rate from said tape accumulation means, said second control means causing said tape withdrawal rate to be at least as great as said tape input rate whenever said tape accumulation means is filled, said second control means also including means capable of causing tape withdrawal from said tape accumulation means at a faster rate than said tape input rate whereby the amount of tape stored in said tape accumulation means may be varied; and presentation means selectably connectable to either of said tape reading means.

9. The system of claim 8 wherein both said tape reading means have rotating reading heads, and further characterized by means for causing said reading heads to be rotated at a velocity much greater than that of the lengthwise movement of said tape.

10. The system of claim 9 wherein said tape is endless, and further characterized by second tape accumulation means for receiving said tape from said second tape reading means, said second tape accumulation means having the capacity to store all excess tape not stored in said first tape accumulation means.

11. The system of claim 9 further characterized by a rotatable take-up reel connected to receive said tape from said second tape reading means, and means constantly urging said take-up reel toward rotation in a direction winding said tape upon said reel.

References Cited

UNITED STATES PATENTS

| | | | |
|---|---|---|---|
| 2,837,606 | 6/1958 | Barthe | 179—100.1 |
| 3,095,482 | 6/1963 | Whiteford | 179—100.2 |
| 3,293,377 | 12/1966 | Backers et al. | 179—100.2 |

BERNARD KONICK, *Primary Examiner.*

A. I. NEUSTADT, *Assistant Examiner.*